2,888,153

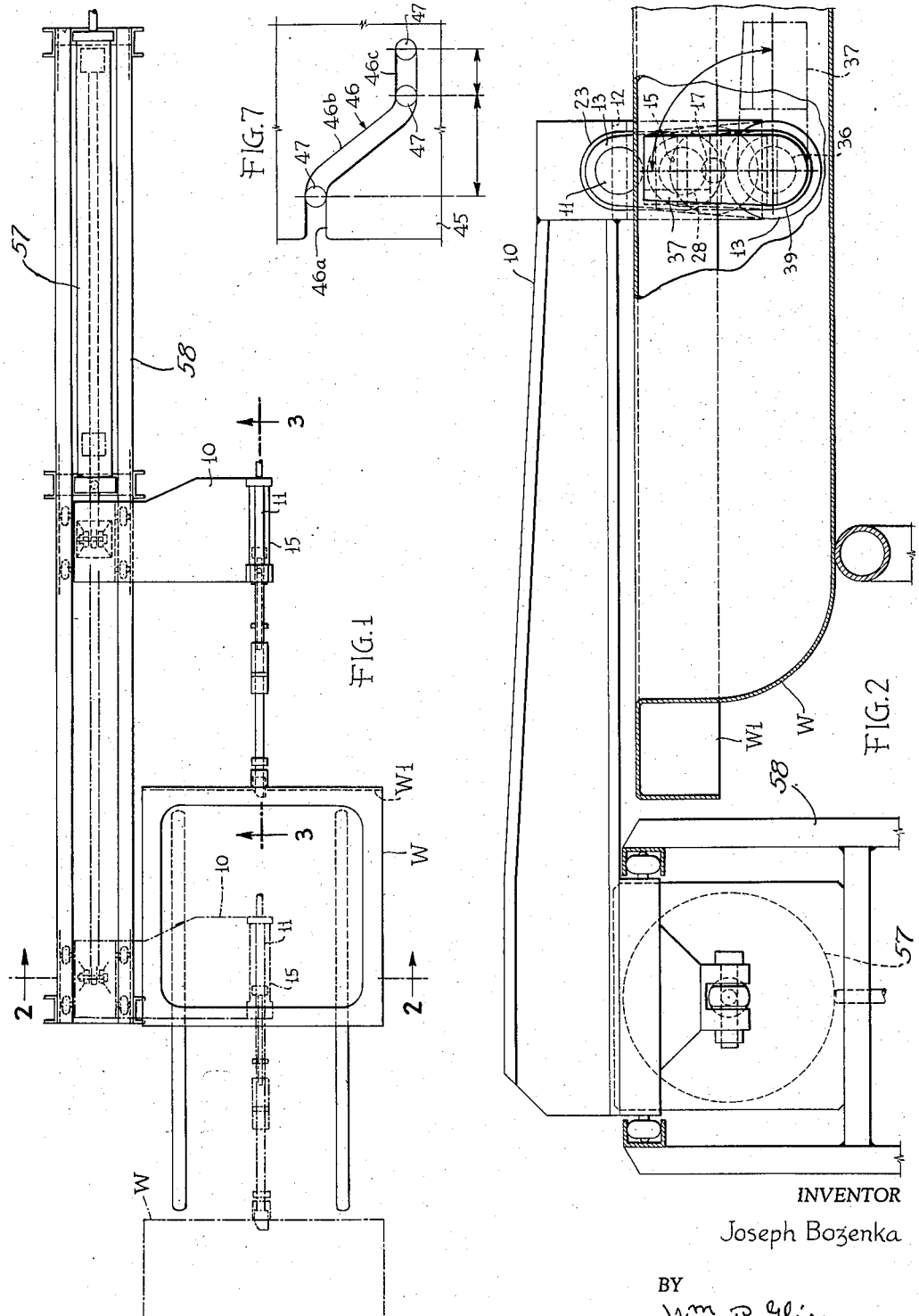

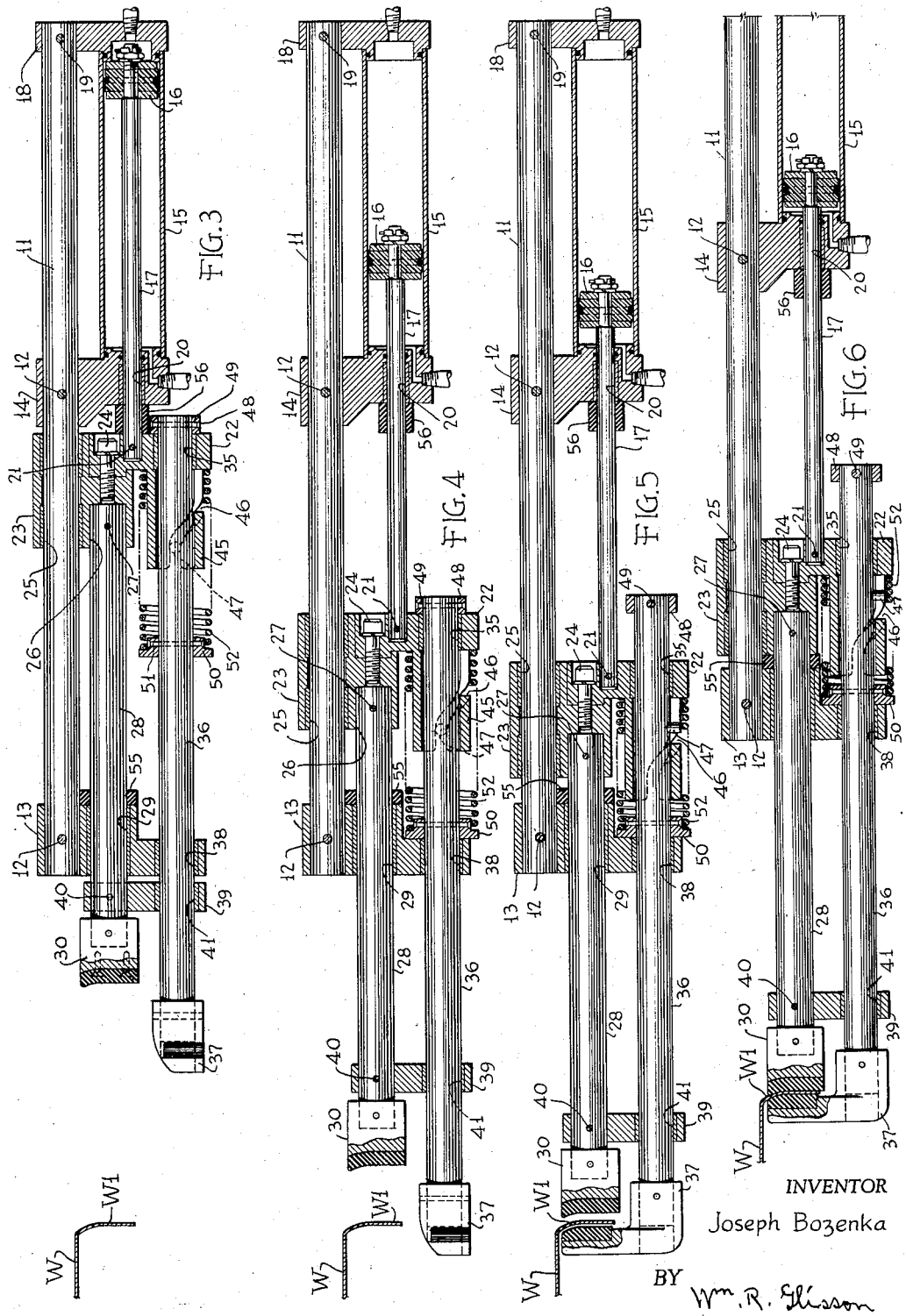

WORK HANDLING APPARATUS FOR SHEET FORMING PRESSES AND THE LIKE

Joseph Bozenka, Norristown, Pa., assignor to The Budd Company, Philadelphia, Pa., a corporation of Pennsylvania Application December 7, 1956, Serial No. 626,849

5 Claims. (Cl. 214—1)

This invention relates to work handling apparatus, particularly a workpiece gripping hand, as for sheet forming presses and the like, the hand engaging a transverse flange of an article while the hand is halted at a fixed position, and has for an object the provision of improvements in this art. The invention is related to that of the copending application of Charles C. Halberstadt, Serial No. 626,855, filed December 7, 1956, assigned to a common assignee. That application relates to a mechanical hand which is adapted to grip flanged workpieces without injuring them, specifically to grasp a workpiece behind the flange; the present invention relates to a mechanical hand which is adapted to grasp the flange itself.

Heretofore hands or grippers have been provided for removing stampings from presses but so far as known these hands gripped the workpiece while there was forward motion, the movable finger or jaw being closed, for example, by the engagement with a camming element in passing, see Patent 2,275,561 and others; but evidently smooth-edged workpieces were the only ones dealt with because the gripping action while the hand was travelling was not suited for grasping flanged workpieces.

One of the particular objects of the invention is to provide a gripping hand which has one of its fingers or jaws moved to a fixed longitudinal position and brought into gripping position relative to a transverse workpiece flange before the fingers are gripped upon the flange.

Another object is to cause both the longitudinal movement and the gripping movement by a single power actuator so as to insure that the proper finger position is attained before the fingers are brought into gripping engagement with the flange and also to insure that the fingers have moved clear of the flange before they are moved longitudinally away from the workpiece.

Another object is to provide simple and inexpensive but rugged and durable apparatus for handling flanged workpieces.

The above and other objects of the invention will be apparent from the following description of an exemplary embodiment, reference being made to the accompanying drawings thereof wherein:

Fig. 1 is a plan view of apparatus embodying the invention;

Fig. 2 is an enlarged vertical transverse elevation and section taken on the line 2—2 of Fig. 1;

Fig. 3 is an enlarged vertical longitudinal section of the gripper mechanism alone, the section being indicated by the line 3—3 in Fig. 1 although the parts are in a different position.

Fig. 4 is a view like Fig. 3 but showing the parts in a different position.

Fig. 5 is a similar view but with the parts in another position;

Fig. 6 is a similar view with the parts in another position; and

Fig. 7 is a developed flat view of an operating cam groove.

The illustrated apparatus comprises a support 10 which is arranged for to-and-fro or reciprocating movement by means, later to be described, so as to remove a workpiece W having a depending transverse flange W1 from a forming press, not shown.

The support includes a guide rod 11 having rigidly secured thereto at spaced points, as by drive "rollpins" 12, two guide members 13 and 14 for carrying the hand gripping means and the power operating means therefor. The guide members are preferably formed of a light metal such as aluminum.

At one side the guide member 14 supports a power device comprising a cylinder 15, a piston 16 and a piston rod 17. The cylinder through its head 18 is secured to the guide rod 11 by a pin 19 and to the guide member 14 by a plurality of clamp rods, not shown. The piston rod 17 operates through a bushed guide bore 20 in the guide member 14 and has secured thereto, as by a drive "rollpin" 21, a slide 22.

The slide 22 is made in two parts, the lower part 22 being that which is directly attached to the piston rod and an upper part 23 being attached thereto as by cap screws 24.

The upper part 23 is provided with a lined guide bore 25 which receives the guide rod 11 for movement of the slide on this rod between the two spaced guide members 13 and 14.

The part 23 has secured thereto, as in a socket 26 by a drive "rollpin" 27, a support rod 28 which is guided for reciprocating movement in a lined guide bore 29 of the guide member 13. On its end the support rod 28 carries a first gripping finger or jaw 30.

The slide member 22 at its lower portion is provided with a lined bearing bore 35 in which a support rod 36 is supported for sliding and turning movement. The outer end of the support rod 36 carries a second finger or jaw 37 which has turning as well as reciprocatory movement.

Intermediately the support rod 36 is guided in a lined bearing bore 38 in the guide member 13. A guide member 39 secured to the support rod 28 for the first finger or jaw, as by a drive "rollpin" 40, is provided with a lined bearing bore 41 for the support rod 36 of the second finger or jaw.

Means are provided for moving the support rod 36 out until the second jaw is disposed at a predetermined fixed position just past the flange W1 and then turning it so that it stands up behind the flange facing the first jaw. The means herein provided for this purpose includes a tubular extension 45 formed on the slide member 22 with its bore disposed coaxially with the bearing bore 35, the tubular extension being formed with a cam groove or slot 46 which receives as a cam follower the end of a pin 47 which is rigidly secured in the support rod 36.

A collar 48 is secured on the rear end of the support rod 36, as by a rivet pin 49, to limit the forward movement of the support rod at the end of the bore 35 in the slide member 22. A second collar 50 is secured to the support rod 36, as by a rivet pin 51; and a compression spring 52 acting between the collar 50 and the slide member 22 urges the support rod in a forward direction.

After a predetermined length of movement, which is less than the full stroke of the power device 15, 16, the collar 50 comes against the side of the guide member 13 and this stops the second finger or jaw in a fixed longitudinal position just beyond the flange W1. Thereafter the further movement of the slide member 22 and its cam sleeve 45 cause the support shaft to be turned to bring the second finger or jaw up behind the flange but without any change in its longitudinal position. The spring 52 opposes this forward movement of the slide member 22 and when the power device is rendered ineffective the spring will return the support rod 36 to its original position relative to the slide member 22.

The cam groove 46 (Fig. 7) is straight at 46a at its open forward end where the follower pin 47 enters, then is inclined spirally at 46b to turn the rod 36, and finally is straight at 46c to hold the second finger in its turned position during the final movement of the piston rod which brings the first finger or jaw up to clamp the flange W1 against the second jaw.

A resilient stop collar 55, as of "Fabreeka," is provided around the slide rod 28 at the support guide member 13 against which the slide part 23 stops at the end of its outward movement and another resilient collar 56, as of "Fabreeka" is provided around the piston rod 17 at the support guide member 14 against which the slide part 22 stops at the end of its rearward movement.

The action can be followed from the drawings.

In Fig. 1 the feed-out or pull-out mechanism is shown at rest in its rearmost position, a workpiece W having been pulled out ready for removal and another, shown in broken lines, ready to be pulled out, being in position, as in a press, ready to be removed.

In Fig. 3 the pull-out mechanism has been moved forward bodily, as by a cylinder-piston power device 57 (Fig. 1) carried on a side stand 58, until it is ready to enter the press zone to grasp a workpiece.

In Fig. 4 the piston rod 17 of the gripper mechanism has moved forward until the collar 50 comes against the stop portion of the guide member 13. This limits the forward movement of the second jaw or finger 37 to a position just beyond the flange W1 of the workpiece and further forward movement of the piston rod will cause the second jaw 37 to turn up behind the flange W1.

Fig. 5 shows the jaw 37 in its turned-up position. The forward movement of the piston rod has also caused the first jaw 30 to move forward but not enough to grasp the workpiece until the second jaw has been turned fully up to its proper grasping position behind the flange. This action occurs while the cam pin 47 moves in the inclined portion 46b of the cam groove 46.

Fig. 6 shows the final grasping position after the first jaw has been pushed fully forward while the cam pin 47 moved in the final straight portion 46c of the cam groove.

The long-stroke power device 57 now moves the gripping mechanism and the workpiece carried by it to the off position, as shown in Fig. 1 after which the piston rod 17 is withdrawn to first move back the first jaw 30, then turn down the second jaw 37, and finally to withdraw the jaws from the workpiece. The back of the second jaw 37 is made smooth and inclined downward toward the end to assist the flange in dropping off.

It is thus seen that the invention provides a simple and effective feed mechanism for handling workpieces by their edge flanges without marring them.

While one embodiment of the invention has been described for purposes of illustration it is to be understood that there may be other embodiments and modifications within the general scope of the invention.

What is claimed is:

1. Work handling apparatus, adapted to grasp a workpiece by a transverse flange, comprising in combination, a movable support mounted for a to-and-fro traversing movement, a gripping hand mechanism mounted on said support for separate to-and-fro traversing movement, said gripping hand including two jaws for engaging a workpiece, and power means carried on said support and connections therefor with said hand for first traversing one of said jaws and bringing it into a longitudinally fixed position relative to the workpiece, then by continued movement bringing the jaws into proper relative position to engage a transverse flange of the workpiece, and thereafter by further continued movement bringing the jaws together on the flange of the workpiece, one of said jaws being mounted for turning movement about an axis aligned with the direction of traversing movement and having means between it and the said power means for turning the jaw into a position behind the transverse flange after it has moved to a position past said flange, said jaw turning means including a longitudinal shaft and a cam for turning the shaft.

2. Work handling apparatus, adapted to grasp a workpiece by a transverse flange, comprising in combination, a movable support mounted for a to-and-fro traversing movement, a gripping hand mechanism mounted on said support for separate to-and-fro traversing movement, said gripping hand including two jaws for engaging a workpiece, and power means carried on said support and connections therefor with said hand for first traversing one of said jaws and bringing it into a longitudinally fixed position relative to the workpiece, then by continued movement bringing the jaws into proper relative position to engage the transverse flange of the workpiece, and thereafter by further continued movement bringing the jaws together on the flange of the workpiece, one of said jaws being mounted for turning movement about an axis aligned with the direction of traversing movement and having means between it and the said power means for turning the jaw into a position behind the transverse flange after it has moved to a position past said flange, said jaw turning means including a longitudinal shaft, a stop on said support for halting the forward movement of said shaft and jaw when the jaw has moved past said flange, and a cam for turning said shaft by further movement of said power means after the forward movement has been halted to bring the jaw up behind the flange.

3. Work handling apparatus as set forth in claim 2, in which said cam includes a straight axial portion at the end of the turning portion to provide axial movement of final approach between said jaws.

4. Work handling apparatus as set forth in claim 2, which further includes resilient means for turning said shaft and jaw back to initial position to clear the flange when said power means retracts.

5. Work handling apparatus adapted to grasp a transverse flange of a workpiece and transfer the workpiece, comprising in combination, a longitudinally reciprocable guide rod, a rod guide carried by the forward end of the guide rod, a slide reciprocably mounted on said guide rod, power means mounted on said guide rod for reciprocating said slide on said guide rod, a jaw supporting rod carried by said slide and slidable in said rod guide, a first gripping jaw carried on the forward end of said jaw supporting rod, a shaft bearing and cam sleeve carried by said slide, a jaw supporting shaft slidably and rotatably carried in said shaft bearing and cam sleeve, a turning cam connection between said shaft and cam sleeve to cause the shaft to turn when it is moved endwise, said shaft being slidably mounted in a bearing in said rod guide, a turnable second gripping jaw carried on the forward end of said shaft, a collar secured to said shaft at its rear end behind said slide and a second collar secured to the shaft at a distance in front of the slide, and a spring between the slide and second collar urging the shaft forward in the slide, the forward movement of said slide first causing both jaws to move forward together until the second jaw reaches a forward position, then continued forward movement of the slide when the second collar engages the rear of the rod guide causing the second jaw to turn to a position behind the workpiece flange, and the further continued forward movement of the slide causing the first jaw to engage the flange with the second jaw.

References Cited in the file of this patent

UNITED STATES PATENTS

| | | |
|---|---|---|
| 1,526,517 | Voght | Feb. 17, 1925 |
| 2,352,632 | Heyman | July 4, 1944 |
| 2,381,657 | Eksergian et al. | Aug. 7, 1945 |
| 2,679,430 | Byron | May 25, 1954 |
| 2,755,759 | Roberts | July 24, 1956 |
| 2,763,229 | Sahlin | Sept. 18, 1956 |
| 2,781,136 | Sehn et al. | Feb. 12, 1957 |